United States Patent [19]

Kondo et al.

[11] Patent Number: 4,749,422

[45] Date of Patent: Jun. 7, 1988

[54] PROCESS FOR PREPARING A FIBER-REINFORCED PLASTIC STRUCTURE HAVING BRANCHING POINTS

[75] Inventors: Katsumi Kondo; Yasuhiro Tsuchiya; Yasushi Yamazawa; Masaki Terada, all of Toyota; Takatsune Niimi, Aichi; Takashi Yamamoto, Ichinomiya; Kunihiro Matsuba, Nagoya, all of Japan

[73] Assignee: Toyota Jidosha Kabushiki Kaisha, Toyota, Japan

[21] Appl. No.: 749,447

[22] Filed: Jun. 27, 1985

[30] Foreign Application Priority Data

Jun. 29, 1984 [JP] Japan .................. 59-134570

[51] Int. Cl.⁴ .................................... B65H 81/00
[52] U.S. Cl. .................... 156/166; 156/433
[58] Field of Search ............ 156/166, 169, 172, 173, 156/175, 245, 433, 441, 91; 264/275, 277, 278.1, 258; 74/522

[56] References Cited

U.S. PATENT DOCUMENTS

| | | | |
|---|---|---|---|
| 2,878,038 | 3/1959 | Noland | 156/172 |
| 3,056,706 | 10/1962 | Knoppel | 156/175 |
| 3,362,253 | 1/1968 | Ditlinger | 74/579 |
| 3,738,885 | 6/1973 | Lecomte | 156/172 |
| 4,137,354 | 1/1979 | Mayes et al. | 156/175 |
| 4,183,259 | 1/1980 | Giovachini et al. | 74/572 |
| 4,378,263 | 3/1983 | Logan | 264/258 |
| 4,394,203 | 7/1983 | Bomparol et al. | 156/175 |
| 4,419,908 | 12/1983 | Reikowski | 156/173 |
| 4,483,214 | 11/1984 | Mayer | 156/166 |

FOREIGN PATENT DOCUMENTS

| | | |
|---|---|---|
| 3038948 | 4/1981 | Fed. Rep. of Germany . |
| 1561120 | 11/1967 | France . |
| 2418487 | 9/1979 | France . |
| 2468156 | 4/1981 | France . |
| 2515094 | 4/1983 | France . |
| 55-91453 | 7/1980 | Japan . |
| 55-115117 | 9/1980 | Japan . |
| 5249443 | 10/1980 | Japan . |
| 56-57576 | 5/1981 | Japan . |
| 59-143764 | 8/1984 | Japan . |
| 2004835 | 4/1979 | United Kingdom . |
| 2041858 | 9/1981 | United Kingdom . |

*Primary Examiner*—Michael Ball
*Attorney, Agent, or Firm*—Oblon, Fisher, Spivak, McClelland & Maier

[57] ABSTRACT

A process for preparing a fiber reinforced plastic structure having points of branching, which comprises the steps of, positioning pins at points of branching in the structure and repeatedly hanging and repeatedly stretching a resin-impregnated strand of continuous long-staple fibers over and between said pins, thereby completing the structure of the points of branching.

11 Claims, 2 Drawing Sheets

PROCESS FOR PREPARING A FIBER-REINFORCED PLASTIC STRUCTURE HAVING BRANCHING POINTS

BACKGROUND OF THE INVENTION

1. Field of the Invention

The present invention relates to a Fiber-Reinforced Plastic (FRP) structure, and more particularly to a process for preparing a fiber reinforced plastic structure having at least one branching point such as, for example, a steering wheel core from a resin-impregnated strand of continuous long-staple fiber and to the product obtained from this the method.

2. Description of the Background

In the past the steering wheels of automobiles, for example, have been produced from polyurethane resin and polypropylene resin with the objective of reducing the weight thereof. However, since steering wheels formed solely of such resins do not offer the necessary strength, such steering wheels have instead been prepared by molding the resins with iron bars or iron pipes laid skeletally within the structure as its reinforcing core. Thus, in the production of steering wheels the weight of reinforcing material is normally about 40% of the total weight of steering wheel. These steering wheels do not meet the full objective of weight reduction, with a further disadvantage being that, depending on the intensity of vibrations exerted on the wheel, the outer resin structure of the wheel may separate from the reinforcing material.

As disclosed in the specification of British Patent Publication GB No. 2,004,835 A, a method has recently been described for the preparation of a shaped structure by winding a resin-impregnated fiber strand obtained by impregnating continuous long glass or carbon filters with polyester resin or epoxy resin on a suitably shaped frame or pattern. When a steering wheel is manufactured by forming a core of a resin-impregnated fiber strand of continuous long-staple fibers in accordance with this method, the steering wheel produced has the advantage that it is of a notably light weight because the resin-impregnated fiber strand is very much lighter than iron and the problem of separation between the outer resin and the reinforcing core, because of vibration, is eliminated because the resin-impregnated fiber strand is very tightly adhesive to the molded outer resin such as polyurethane.

When the reinforcing core for the steering wheel is prepared by the above-described method without any modification, a large void 4 tends to form where ring position 2, on which a resin-impregnated fiber strand 1 is wound in the circumferential direction of the wheel, and spoke portions 3, on which the same fiber strand 1 is wound in the radial direction of the wheel, join as illustrated in FIG. 7. When a bending stress or torsional force is exerted on the ring part 2, the applied stress is concentrated on the portion of the wheel where the void is at the juncture of the spokes and the ring portion with the result that cracks can occur between the branched resin-impregnated fiber strands. When the crack is left to grow gradually, a fracture may possibly result at the joint. A need therefore continues to exist for a method of manufacturing a fiber-reinforced plastic structure of improved structural and strength characteristics.

SUMMARY OF THE INVENTION

Accordingly, one object of the present invention is to provide a method for preparing a fiber-reinforced plastic structure such as a steering wheel which is light in weight, exhibits excellent resistance to vibration, and has points of branching which are sufficiently strong which enables the structure to resist destruction by powerful external loads.

Briefly, this object and other objects of the present invention as hereinafter will become more readily apparent can be attained in a process for preparing a fiber reinforced plastic structure by positioning pins at the points of branching in the structure, and repeatedly hanging and stretching a resin-impregnated strand of continuous long-staple fibers over and between said pins, thereby completing the structure.

In another embodiment of the invention, a structure is completed by hanging and stretching a resin-impregnated strand of continuous long-staple fibers on and around a die, branching the strands thereby forming branching points in the structure, and typing up the branching points with a tying member in the vicinity of each of the branching points.

In still another embodiment of the invention, a structure is completed by disposing pins at the location of each branching point, hanging and stretching a resin impregnated strand of continuous long-stable fibers on and between the pins, and then tying up each of the branching points with a tying member in the vicinity of each of the branching points.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

The term "continuous long-staple fibers" as used in the present invention indicates continuous fibers or rovings which are formed by roving. Suitable examples of continuous long-staple fibers which can be used in the present invention include glass fibers, carbon fibers, polyamide fibers, various ceramic fibers, and the like. The use of carbon fibers with high strength and high elasticity proves more advantageous than glass fibers from the viewpoint of weight reduction. In an alternative embodiment of the invention, fibers of different types may be used in combination to suit a given purpose. The thickness and the number of fibers which are used are not critical factors. Preferably, in the preparation of a given object or device a strand of about 2,000 to about 30,000 glass fibers of a diameter of 8 to 30 $\mu$m, preferably of 15 $\mu$m, or as many carbon fibers having a diameter ranging from 7 to 15 $\mu$m is advantageously used in the present invention. The resin-impregnated strand obtained by impregnating a strand of continuous fibers with resin, therefore, has a diameter in the range of a little over 1 mm to a little under 10 mm, preferably 2 to 3 mm.

Suitable examples of the resin which are used to impregnate the continuous long-staple fibers include thermosetting resins such as epoxy resins for example, Araldite LY556, HY917J, DY070 manufactured by CIBA-GEIGY Limited, unsaturated polyester resins, phenol resins, and polycarbonate resins, and thermoplastic resins such as polystyrene resins, polyvinyl chloride resins, and polyurethane resins. These resins may be used either singly or in varying combinations. The viscosity of the resin bath during impregnation of the fiber strand should be within the range of 50 to 250 cP.

Figure 7:
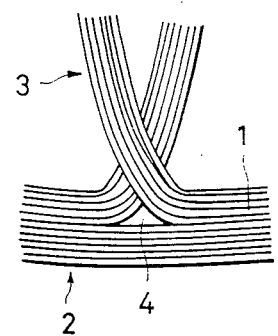
FIG. 7 is a diagram illustrating the condition of the positioning of resin-impregnated fiber strands at the branching points of the conventional fiber reinforced resin structure.

The present invention has an objective to increase the density of resin-impregnated fiber strands at the branching points discussed above relative to FIG. 7 in order to avoid the occurrence of voids at this position by winding the resin-impregnated fiber strands taut over or between pins suitably disposed in the region or by tying up the wound strands with the same around the branching points of the aforementioned fiber strands. As a result, the resin-impregnated fiber strands are joined fast and the branching points of the fiber strands are vested with sufficiently high strength which makes separation of the fiber strands extremely difficult or, at least, retards the progress of the separation. Thus, plastic structures produced by this procedure exhibit notable improvement in durability and reliability under loads. The present invention, therefore, provides a structure such as a steering wheel which is light in weight, has excellent stability in resisting vibration, and has a sufficiently high strength.

The members which are used as tie-up devices for fastening the branching points of the aforementioned fiber strands or the nearby portions thereof can be resin-impregnated fiber strands of continuous long-staple fibers of the same kind as or of a different kind from the continuous long-staple fibers used in the branched portions. Alternatively, a tape or ribbon of a prepreg, preferably a monodirectional prepreg can be used, for example.

In order to provide pins at the branching points of a structure, it is most desirable to dispose, at prescribed locations at the branching points, branching guide members which are provided with stationary pins thereon. The pins which are used in the present invention are preferably suitably disposed on the branching guide members in such a manner that they enable the resin-impregnated fiber strands to be tightly arranged in a mutually entangling pattern. The number and the shape of such pins are not critically important factors. Optionally, two or more pins may be disposed in each of a plurality of paths along which the fiber strands are wound taught. In this case, by suitably disposing a plurality of pins and consequently regulating the arrangement of the resin-impregnated fiber strands within the branching guide members with the aid of the pins, the fiber strands wound and stretched in different directions can be superposed tightly within the branching guide members in an intertwined pattern and the force with which the fiber strands are bound to each other is notably increased. Thus, any external load which is applied at the branched points will be distributed throughout the entire branched structure, so that, the branched points enjoy notably enhanced strength and contribute to the improvement of strength of the structure as a whole.

The branching guide members which are used for the above stated purpose can be parts having guiding paths through which the resin impregnated fiber-strands are hung and stretched. For example, the guide members may be a tubular member or a plate provided with grooves through which the aforementioned fiber strands can pass. Also they may be made of a metallic material or a plastic material. In the case of the steering wheel, such branching guide member may be disposed at the points where the fiber strands join in the ring portion and the spoke portions or at the boss part, and preferably it may be one with three forked paths.

Having generally described this invention, a further understanding can be obtained by reference to certain specific examples which are provided herein for purposes of illustration only and are not intended to be limiting unless otherwise specified.

EXAMPLE 1

Figure 1:
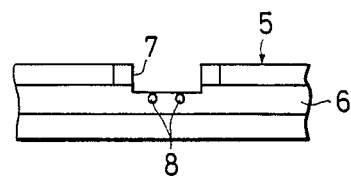
FIG. 1 and FIG. 2 are a plan view and a side view respectively illustrating the essential portion of a die used in the fiber-reinforced plastic structure of Example 1.
Figure 2:
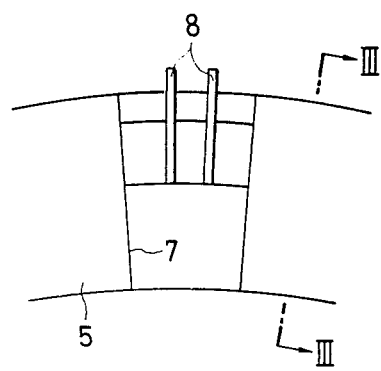
Figure 3:
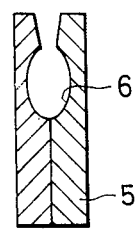
FIG. 3 is a cross section taken through FIG. 2 along the line III—III.
Figure 4:
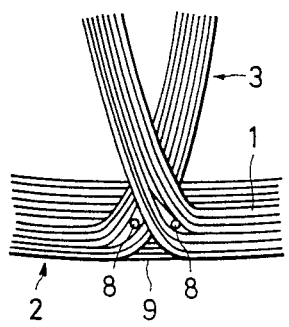
FIGS. 4 through 6 are diagrams illustrating conditions in which resin-impregnated fiber strands are disposed at the branching points of the fiber reinforced plastic structures of Examples 1-3 of the present invention.

In FIGS. 1–3, 5 denotes an annular die which is used for preparing the ring portion of a steering wheel. Throughout the entire periphery of the die 5, a winding groove 6 as illustrated in FIG. 3 is formed. Notches 7 are formed in portion of the inner side wall of the die to establish communication between the winding groove 6 and the center side of the die. Two pins 8 are disposed in juxtaposition in the notches 7. Strands of continuous long carbon or glass fibers obtained by moving and being impregnated with epoxy resin are annularly wound and superposed along the winding groove 6 of the die. At the same time, the aforementioned resin-impregnated fiber strand is branched at the notches 7, preferably alternately from the peripheral direction to the central direction of the die 5, and at the center of the die 5 the strand is wound on the other die to form the boss to complete the steering wheel. The branching in this case is achieved by causing the resin-impregnated fiber strand 1 to be hung around the pins 8 and stretched as shown in FIG. 4. As a result, the fiber strands 1 are intertwined and arranged tightly at the branching points 9 of the fiber strand, i.e. the area where the ring portion 2 and the spoke portions 3 intersect. The steering wheel thus produced is devoid of large voids as found in conventional structures. In the product of Example 1, therefore, even when a considerable strong bending stress or torsional force is exerted on the steering wheel, separation between the joined fiber strands occurs with only great difficulty. Any separation which occurs at all is small in size and proceeds at a notably slower speed. Consequently, the branching points (intersecting parts) show remarkable improvement in strength and durability. The pins 8 can be left within the steering wheel or they can be removed.

EXAMPLE 2

Figure 5:
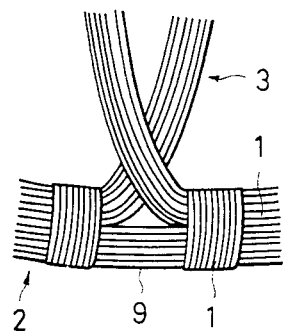

In this example, the resin-impregnated fiber strand 1 of continuous fibers is wound and superposed on a suitable die (not shown) for a steering wheel to form a ring portion 2 and spoke portions 3 as illustrated in FIG. 5. A resin-impregnated fiber strand 1 is wound fast in a suitable number of turns around in the vicinity of each side of the intersecting area of the ring portions and the spoke portion to complete a steering wheel. As a result of this technique of tying, the arrangement of the fiber strand 1 at the branching point 9 (intersecting area of the ring portion and the spoke portion) gains all the more tightness and adhesion between the strands wound. As a result, the minimum load which causes separation at the points of juncture is greatly increased and the strength and durability of the branched portion 9 are enhanced far beyond conventional levels. The tying up of the branched point with the fiber strand 1 is effective particularly when it is performed concentrically in the vicinity of the branched point (intersecting area). This tying up might be advantageous when the width of the tied up area is made 0.5 to 1.5 times as large as the diameter of the ring portion, though it depends on the diameter and number of fiber strands 1 used. But this tying member need not be limited to the resin-impregnated fiber strand 1 of continuous long-staple fibers. In fact a tape or a ribbon of a prepreg such as, for example, a monodirectional prepreg tape can be employed.

EXAMPLE 3

Figure 6:
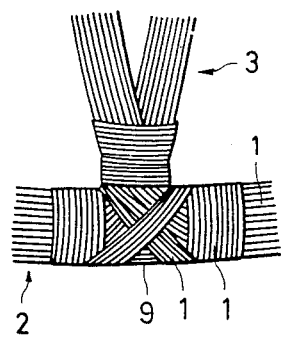

In this example, a ring portion and spoke portions are formed by winding and superposing a resin-impregnated fiber strand of continuous long-staple fibers in the same way as in Example 2. Then a resin-impregnated fiber strand 1, as shown in FIG. 6, is wound in a suitable number of turns in a mutually diagonally intersecting pattern around the branched point 9 to produce a steering wheel. This diagonal method of tying serves to expel air out of the branched point. As a result, the arrangement of fiber strand 1 in the branched point 9 all the more achieves an increase in tightness and the strength of the branched points 9 is still greater than those in Example 2. Even when a large load is exerted in a complicated manner upon the steering wheel, no separation is induced in the fiber strand 1 at the branched point 9. Thus, the steering wheel achieves high performance reliability.

Having now fully described the invention, it will be apparent to one of ordinary skill in the art that many changes and modifications can be made thereto without departing from the spirit or scope of the invention as set forth herein.

What is claimed as new and is intended to be secured by letters patent is:

1. A process for preparing a fiber reinforced plastic structure having points of branching, which comprises the steps of:
    positioning pins at positions in a die which correspond to points of branching in said plastic structure;
    repeatedly hanging and repeatedly stretching a resin-impregnated strand of continuous long-staple fibers in said die and over and between said pins thereby forming said plastic structure;
    branching said strand during the hanging and stretching of said strand at said pins, thereby forming points of branching in said wrapped fiber structure; and
    tying up said branching points with a tying member at each of the branching points or in the vicinity of each of the branching points, thereby eliminating any large void spaces in the fiber structure at the branching points.

2. The process according to claim 1 wherein said tying member is a resin-impregnated fiber strand of continuous long-staple fibers.

3. The process according to claim 1 wherein said tying member is a tape or ribbon of prepreg.

4. The process according to claim 1 wherein said tying member is fastened in a diagonally intersecting pattern at each of said branching points or in the vicinity of said branching points.

5. The process according to claim 1 wherein the resin in said resin-impregnated strand of continuous long-stable fibers is a thermoplastic or thermosetting resin.

6. The process according to claim 5, wherein said thermoplastic resin is a polystyrene resin, a polyvinylchloride resin or a polyurethane resin.

7. The process according to claim 5, wherein said thermosetting resin is an epoxy resin, an unsaturated polyester resin, a phenol resin or a polycarbonate resin.

8. The process according to claim 1 wherein said fiber strand contains from about 2,000 to about 30,000 fibers.

9. The process according to claim 8, wherein said fibers are glass fibers having a diameter of 8 to 30 $\mu$m.

10. The process according to claim 8, wherein said fibers are carbon fibers having a diameter of 7 to 15 $\mu$m.

11. A process for preparing a fiber reinforced steering wheel, which comprises the steps of:
    providing an annular die which contains a winding groove and appropriately placed notches which contain pins and which open inward to the ring exposing the winding groove;
    hanging and stretching a resin-impregnated strand of continuous long-staple fibers through the winding groove of said die;
    branching said strand of fibers at the pins in the notches of said die, thereby forming points of branching in the wheel structure from which spokes project into the interior of the steering wheel; and
    tying up said branched points with a tying member at each of the branching points or in the vicinity of each of said branching points, thereby eliminating any large void spaces in the fiber structure at said branching points.

* * * * *